United States Patent Office 3,555,620
Patented Jan. 19, 1971

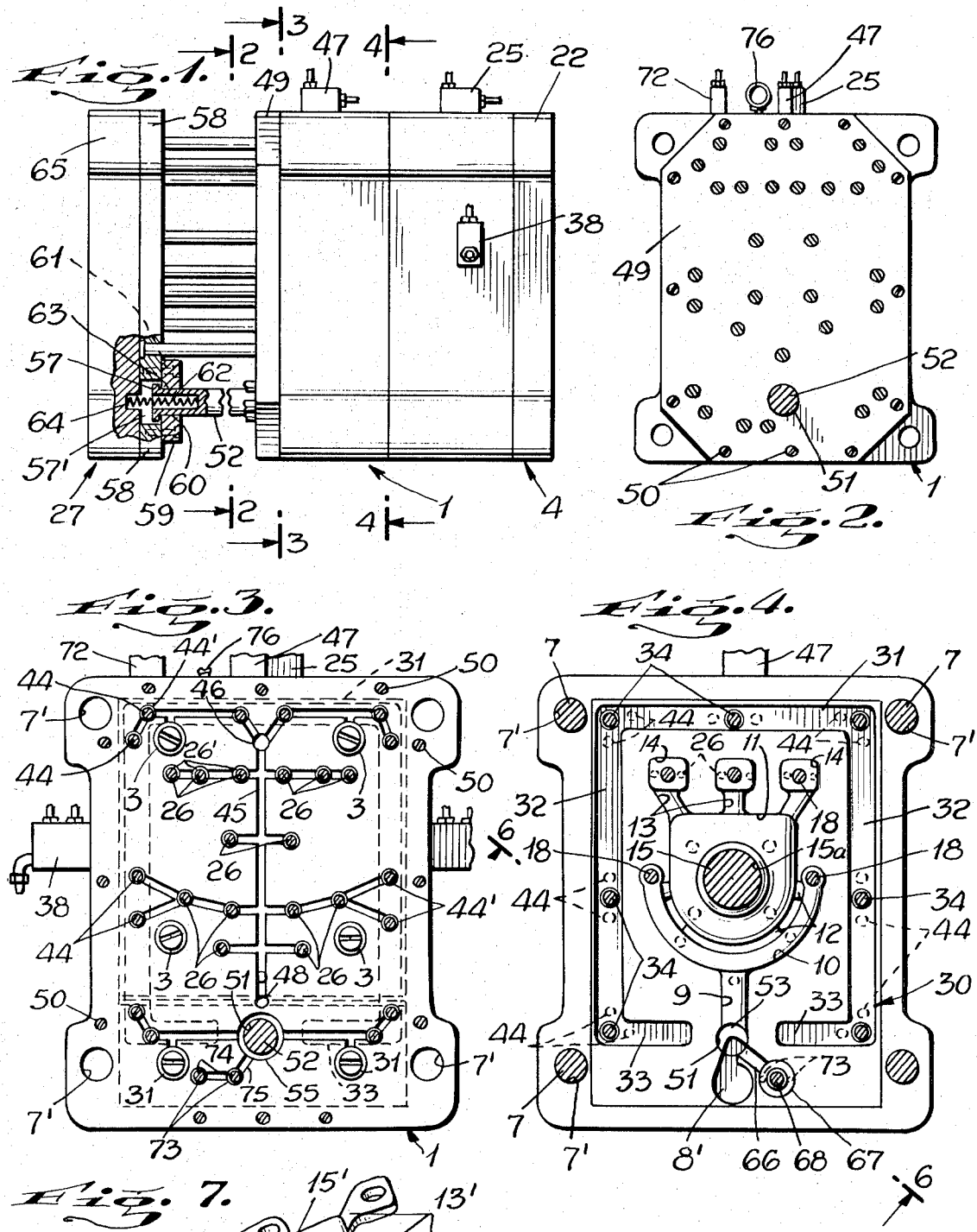

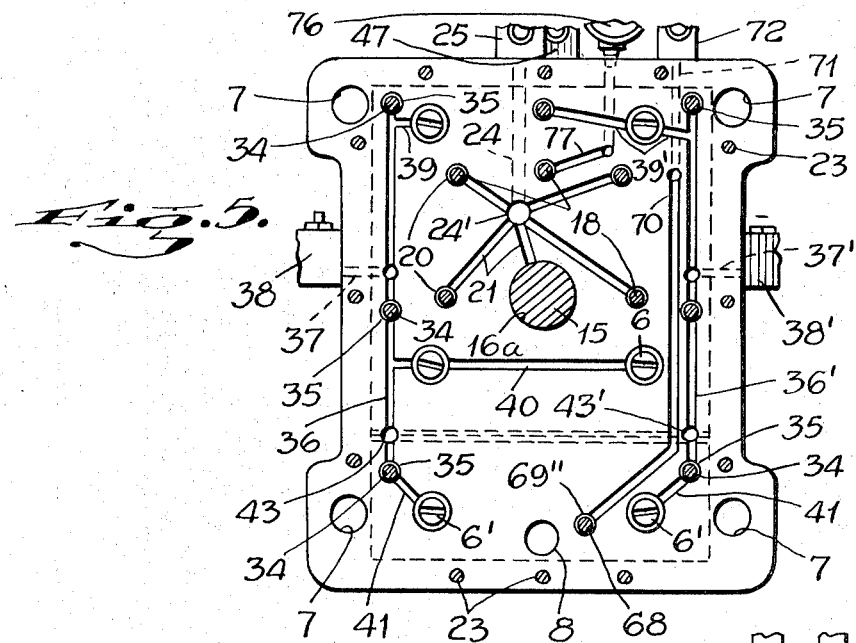
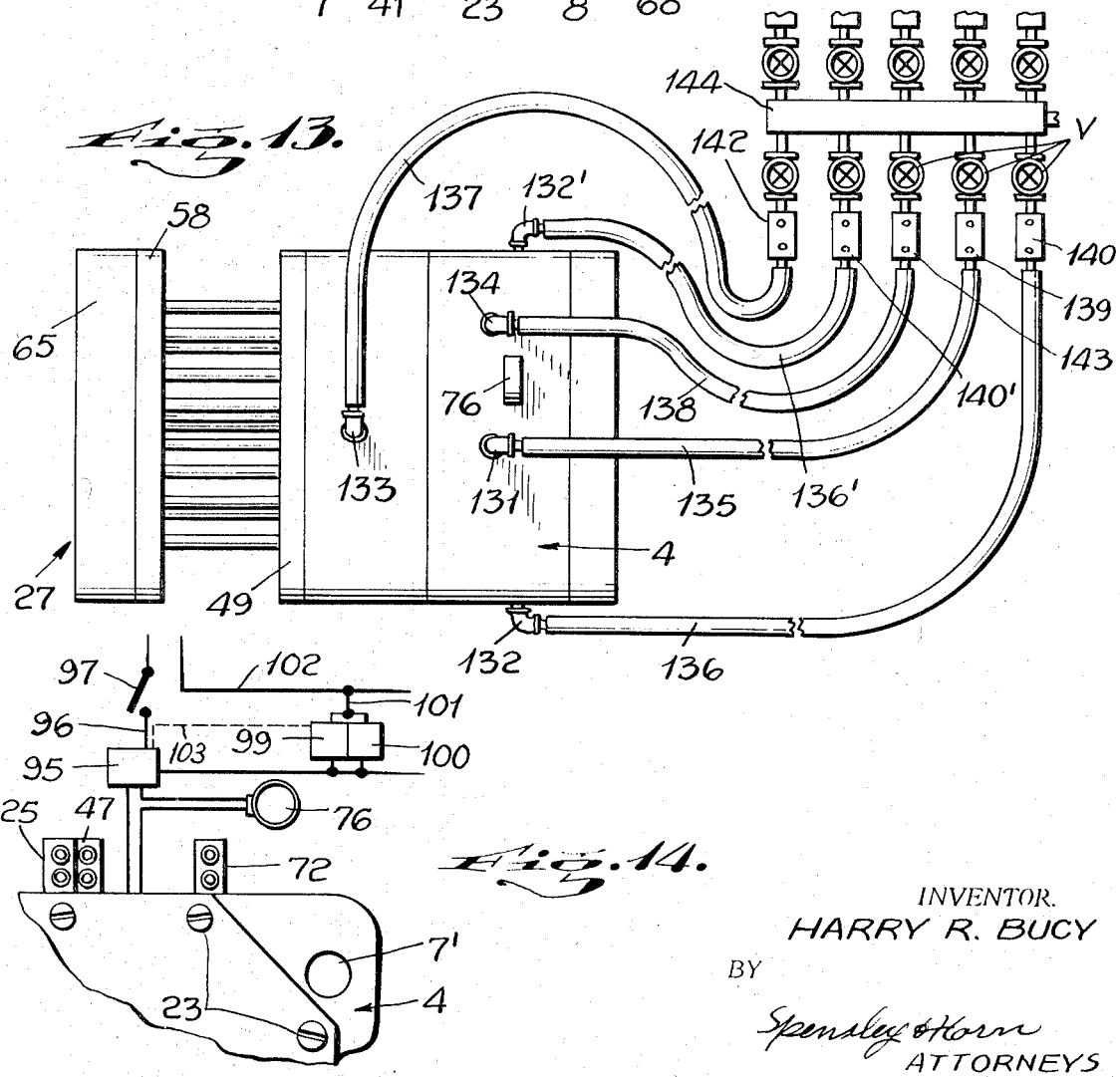

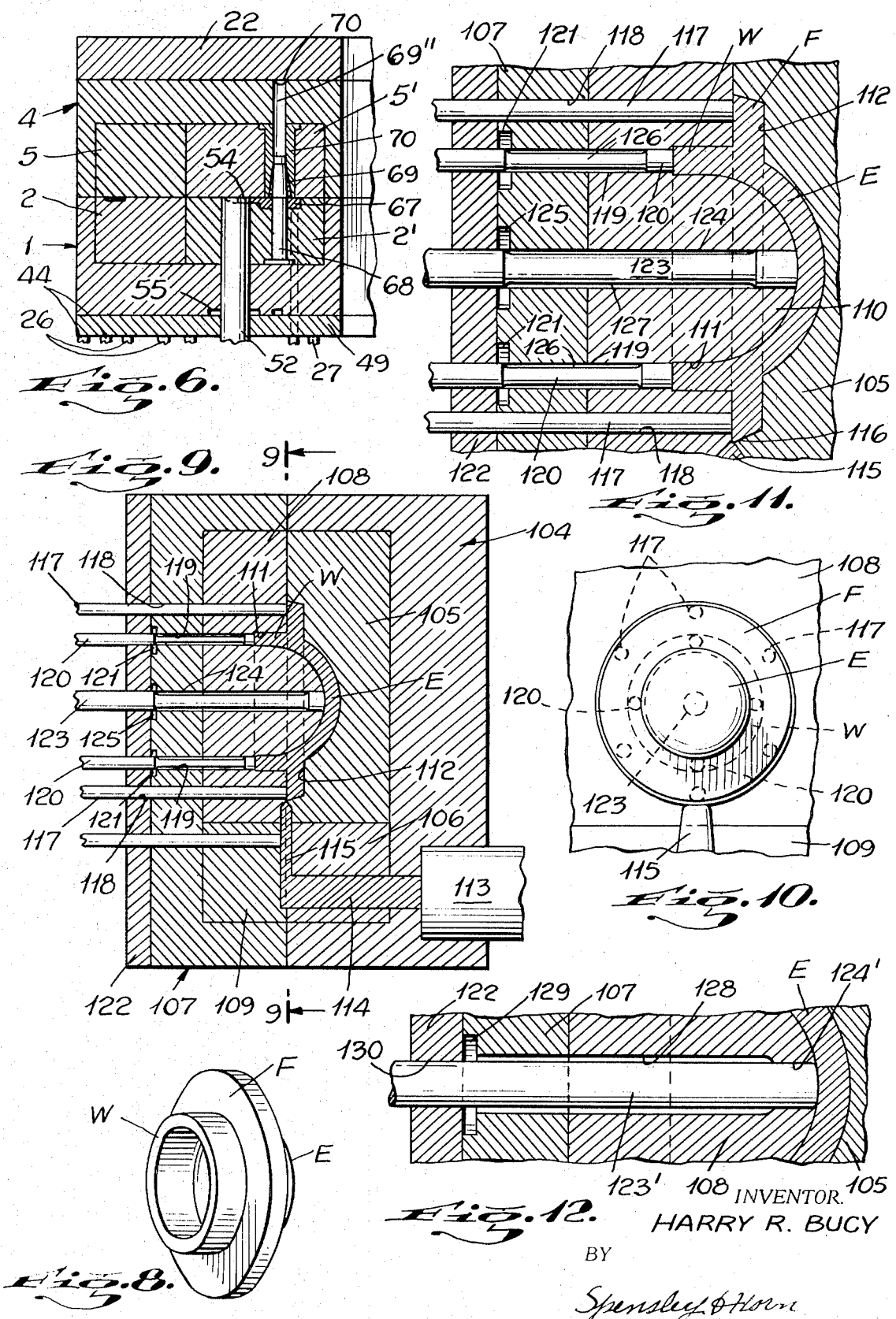

1

3,555,620
MOLD FOR PRESSURE INJECTED MATERIAL VENTED THROUGH EJECTOR PIN GUIDES
Harry R. Bucy, 625 S. Glenwood Place,
Burbank, Calif. 91506
Filed Oct. 17, 1967, Ser. No. 675,968
Int. Cl. B29c
U.S. Cl. 18—42                        20 Claims

ABSTRACT OF THE DISCLOSURE

A mold for pressure injected materials generally similar to the mold disclosed in the co-pending application of applicant's Ser. No. 496,368 filed Oct. 15, 1965, now Pat. No. 3,357,057, granted Dec. 2, 1967, in which the mold cavity or cavities is maintained in an evacuated condition while being filled with the injected molten material, the mold of the present invention being further characterized by achievement of cavity and other evacuating by means disposed remote from the mold and by an added utility of the ejector pin guiding bores as a cavity evacuating instrumentality.

BACKGROUND OF THE INVENTION

(I) Field of the invention

The field of the invention is that of molding or casting pressure injected molten materials in the art known as pressure die casting of metals and injection molding of plastic materials.

(II) Prior art

No prior art was pertinent to the present application cited against the application which resulted in the above-identified patent, and of which application this application is a continuation-in-part, and none is known to applicant.

SUMMARY OF THE INVENTION

In the above identified patent, mold evacuation is achieved through the use of jet pump devices attached to the mold. This requires that from a probable minimum to two or three, to perhaps as many as ten or twelve jet pumps may be required on molds of varying degrees of complexity. One phase of the present invention relates to the improvement of providing the molding machine in which molds embodying the invention are to be mounted and used with a plural outlet source of vacuum whereby as many of such outlets as may be necessary may be coupled by hoses or like conduits to complementary nipples on the mold outer surface, thus giving the mold the same operating characteristics as those supplied with individual jet pumps. Among other objectives of the present invention is the further utility of the guiding bores for the ejector pins to be connected to a suitable source of vacuum whereby said bores may be given added utility in assisting in the evacuation of the mold cavity with resultant assurance of complete filling of portions of a mold cavity which otherwise might be difficult to fill particularly with quick chilling metal alloys, such as aluminum alloys or with high viscosity and slow filling plastic materials. Other objectives and advantages will appear as the description of the illustrated presently preferred embodiments of the invention proceeds, it being understood that the invention resides in the parts and in the construction, combination and arrangement of parts thus disclosed by way of example as well as in any and all equivalents thereof.

2

BRIEF DESCRIPTION OF THE DRAWINGS

In the drawings which form a part of the specification of certain presently preferred embodiments of the invention:

FIG. 1 is a side elevational view of a mold in which a first presently preferred embodiment of the invention is incorporated;

FIG. 2 is a transverse section taken on the line 2—2 of FIG. 1;

FIG. 3 is an enlarged scale, sectional view taken on the line 3—3 of FIG. 1;

FIG. 4 is an elevational view of the die face of the ejector half of the mold shown in the preceding figures, a sprue including the desired casting being shown in position thereon;

FIG. 5 is an enlarged scale sectional view on the line 5—5 of FIG. 1 and showing the rear face of the cover half die shoe;

FIG. 6 is a sectional view taken on the line 6—6 of FIG. 4;

FIG. 7 is a perspective of the sprue as removed from the die face of FIG. 5;

FIG. 8 is a perspective view of a casting formed in a second embodiment of the mold shown in FIGS. 9–12;

FIG. 9 is a vertical medial section through a mold for forming the casting shown in FIG. 8 and embodying the use of at least one of the ejector pin guiding bores as a means for assisting in the evacuation of the mold cavity;

FIG. 10 is a fragmentary view of the ejector half die face of the mold shown in FIG. 9, the casting being shown in place thereon;

FIG. 11 is a greatly enlarged portion of FIG. 9 showing details too small to be illustrated in the scale of FIG. 9;

FIG. 12 is a fragmentary view of the center portion of FIG. 11 showing a modified form of ejector pin guiding bore;

FIG. 13 is a top plan view of the mold shown in FIG. 1 as modified for connection with a remote source of vacuum; and FIG. 14 is a schematic illustration of an automatic control means embodying a vacuum responsive switch.

DETAILED DESCRIPTION OF THE PREFERRED EMBODIMENTS

In all of the foregoing figures in which cavity space for receiving molten material is shown, said space is shown as being filled with the injected material. Also, while as before noted, molds of this character are ordinarily employed in machines in which the movable or ejector die half moves toward away from the cover half are arranged so that the dies move horizontally, some machines move vertically. Accordingly, where such terms as "top," "bottom," "above," "below," etc., it will be understood that such reference is made with respect to molds employed in horizontal machine.

Before proceeding with a description of the features of the present invention, molds of the character with which the present invention is concerned will first be described in general terms as to those components which are usual in such molds. These molds are formed from metal and comprise a stationary or cover die and a movable or ejector die which are also sometimes known, respectively, as the cover half and ejector half. The meeting faces of the dies are suitably contoured to form the space into which the molten material is injected to form the desired casting or castings as well as the various gates, runners, overflow pockets and the like necessarily associated therewith. The cover die is mounted on the stationary platen of a suitable press mechanism and the ejector die is mounted on the moving platen of the press mechanism and is moved by that platen (usually by fluid pressure means) into and out of operative engagement with the cover die. As has been previously mentioned, most presses for such molds are arranged for horizontal operation of the ejector die, and as the description of the examples of the invention proceeds, it will be seen that the invention is adapted for use in either horizontally or vertically operating presses.

MOLD CAVITY, GATE AND RUNNER

Having reference to the first embodiment, shown in FIGS. 1-6, the mold illustrated and to which the present invention is applied, comprises the ejector mold die base 1 formed of steel and having a rhomboidal cavity formed in one face thereof in which die blocks 2 and 2' of tool steel are secured by screws 3 and 3' as will presently be described in more detail. The cover die similarly comprises a steel die base 4 in which tool steel die blocks 5 and 5' are similarly secured by screws 6 and 6'. The cover die base at the corners thereof carries forwardly projecting guidepins or bars 7 fixed thereto and disposed parallel to each other and to the line of movement of the ejector disc and which slidingly engage bores 7' in the ejector die as it moves toward the cover die thereby insuring alignment of the dies with each other. Molten material is supplied under pressure through a passage 8 in the cover die by applied pressure and is caused to flow into the cavity or cavities formed by the dies; said passage, for convenience, being hereinafter designated as the "sprue hole." The molten material receiving cavity of the mold, other than the sprue hole 8 includes a main runner channel 9 leading from a recess 8' formed in the die block 2' opposite the sprue hole 8, thence past a runner stop means forming a part of the present invention hereinafter to be described, and thence extending to the semicircularly extending branch runner 10 connected to the casting forming mold cavity 11 by gates 12. It will be understood that aside from the first portion of the main runner, the shape of the cavity will vary according to the design of the part or parts to be produced. At the side of the illustrated cavity 11, remote from the metal entrance side thereof, three gates 13 connect the cavity 11 to three overflow pockets 14 also to be described in more detail.

Referring momentarily to FIG. 7 for convenience in identification, the portions of the molded article are indicated by the numbers which identify the portions of the cavity by which such portions were formed with the addition of the exponent " ' ". For example, the casting 11' is formed by the cavity 11 and the overflow pads 14' are formed in the overflow pockets 14, etc.

The illustrated casting 11' is formed with a central opening 15' formed by the core element 15 which is carried by the ejector die and which cooperates with a tapered opening in the die block 5 (not shown) and extending through the die block to form a breather of the type described and claimed in my said patent, said tapered opening continuing as an axially aligned bore 16a which extends through the die base 4. Similar breather devices are associated with the ends of the runner 10 and the overflow pockets 14 and similarly extend to the rear face of the cover die base 4, said other breathers comprising replaceable core elements 18 aligned cooperating with bores 20 extending to the rear face of the cover die base 4 and corresponding in function to the tapered opening previously referred to. The bore 16a and all but one of the bores 20 are connected by channels 21 formed by grooves in the rear face of the cover die base 4 and overlying backing plate 22 secured thereto by screws 23 and forming these grooves into closed channels connecting the breather openings to a duct 24 extending from a bore 24' forming a junction with all of the channels 21 to a jet pump means 25 which may be like that employed in my said prior patent and which serves to evacuate the molten material receiving cavity. The remaining breather bore 20 is separately connected to a vacuum gauge or to a vacuum switch as will be presently described.

Additionally, the usual ejector pins 26 are carried by the ejector plate assembly 27 associated with the ejector die and the ejector plate assembly is given the necessary movements relative to the ejector die to cause the ejector pins to be retracted during a casting or molding operation and to be projected into the mold cavity upon separation of the dies to dislodge the casting, such relative movement being imparted by any of the various modes usually employed for that purpose.

As thus far described, the mold without the further improvement of my invention will operate better than any conventional mold provided with the heretofore commonly used side vents in the meeting faces of the die but when a mold is subjected to the degree of evacuation which the means of my said prior patent is capable, due to the fact that air can always enter the mold cavity through spaces between the ejector pins and the bores in which they reciprocate when the cavity is subjected to negative pressure as well as the air which is present in the sprue hole prior to making a shot, the degree of evacuation of the mold cavity is limited and can be increased only if suitable sealing means can be achieved.

It is known that some attempts have been made to achieve a sealing on the meeting faces of the dies of a mold by the employement of gaskets and by the use of gasket devices around ejector pins but neither of these proposals has resulted in adoption by the art generally for the reason that they have not been found to be practical. The present invention proposes the interposition of zones of vacuum between the exterior of the mold and the mold cavity at all points where air might otherwise enter the mold cavity so that the employment of the evacuating means of my said prior patent can operate to achieve maximum evacuation of the mold cavity, per se, and that any possibility of air entering the cavity in response to the evacuation thereof is prevented.

The mold sealing means of the present invention will be considered under two subdivisions (a) the sealing at the meeting faces of the dies and (b) the sealing at the surfaces of mold components which have relative movement to each other accompanied with simultaneous movement of such components with at least one of the dies as, for example, the space between ejector pins and their guiding bores or between the relatively moving surfaces of a retractable core and the portion of a mold with which it has bearing engagement of a type affording access of air to the mold cavity.

DIE FACE SEALING MEANS

The means for effecting sealing of the meeting faces of the dies comprises the provision of a shallow groove 30, preferably in the face surface of the ejector die block or blocks and disposed close to the edge of the die base cavity in which the die block component is contained, said groove comprising in the illustrated embodiment a top portion 31, parallel side portions 32, 32 and bottom portions 33, 33 which project toward each other in a horizontal plane containing the runner stop means, to be later described and terminating short of said runner stop means. Extending from the rear faces of the die blocks 2 and 2' are breather core pins 34 projecting into and cooperating with axially aligned bores 35 extending through the cover die base 4, the breathers so formed here shown as disposed at the corners of the groove 30 as well as the midlengths of the portions 31 and 32 thereof, it being understood that this groove may be otherwise disposed dependent on the configuration of the cavity.

The rear face of the cover die base 4 is provided with grooves indicated by the numeral 36 which interconnect those of the breather bores 35 which extend along the left hand side of the mold as viewed in FIG. 7, with a duct 37 extending into the die block 5 and thence laterally out of the adjacent side of the die base, said duct exteriorly of the die base being connected to the inlet of a jet pump device 38. Additionally, a groove 39 connects the groove 36 with a counterbore surrounding the head of one of the screws 6 which is adjacent both to the portions 31 and 32 and a second groove 40 similarly connects the groove 36 with the corresponding counterbores which surround the heads of the two screws 6 which secure the end of the die block 5 adjacent to the die block 5' while a third groove 41 connects the groove 36 with a counterbore surrounding the head of the adjacent one of the screws 6' which secures the die block 5' in the die base 4. At the right hand side of the rear face of the cover die base as viewed in FIG. 7, grooves 36', 39' and 41' similarly connect the adjacent bores 35' and the counterbores surrounding the head of the screws 6 and 6' with a duct 37' and jet pump 38' with the addition of an extension to the groove 39' to connect it to the bore 35' at the center of the sealing groove portion 31.

By attachment of the backing plate 22, these grooves are connected into conduit means and by actuating the jet pumps 38 and 38' a vacuum is produced throughout the groove 30 wherefore, any air seeking to enter between the juxtaposed die faces is evacuated from the sealing groove before it can reach the mold cavity. This is obviously much better than the shortlived gaskets which (apart from shrouds) has been the manner most often employed in efforts to effectively seal the meeting faces of dies in order to evacuate a mold cavity.

To guard the possibility that air might be caused to leak to the evacuated mold cavity by passing between the die blocks 5 and 5' and thence from between the die blocks to the mold cavity, the corners of the die blocks 5 and 5' at the juxtaposed rear faces of the blocks are slightly beveled as at 42 and each of the grooves 36 and 36' is connected by bores 43 and 43' with the interior of the die block cavity opposite the channel formed by the said adjacent beveled corners with the result that any air entering between the die blocks 5 and 5' and the cavity walls is evacuated by the jet pumps 38 and 38'.

SEALING EJECTOR PIN BORES

Mention has been made of the fact that air can enter the mold cavity between the ejector pins which enter the mold cavity and the bearing surfaces for said ejector pins in the ejector die. To overcome this source of air leakage, the bore for each casting ejector pin 26 at the point of emergence therefrom the rear face of the ejector die base is provided with a shallow counterbore 26'. Due to the possibility that some mishap may cause a flow of molten material into the sealing groove 30, each of the breather cores 34 associated therewith may, if desired, be accompanied by a pair of ejector pins 44 disposed one at each side thereof and said pins are operative in the event of metal or plastic entering the groove 30 to dislodge such material at the same time in the same manner as the casting ejector pins 26 eject the casting from the mold cavity. If these sealing groove ejector pins are employed, the bores in which they are guided at the point of emergence thereof from the rear face of the die base 1 may, if desired, be surrounded by shallow counterbores 44' similar to the counterbores 26'. Additionally, the head of the die block securing screws 3 and 3' are surrounded by counterbores similar to the counterbores surrounding the corresponding screws 6 and 6' and all of these counterbores are connected by a series of grooves designated generally by the numeral 45 with a duct 46 extending into the die base and thence out of the die base at the top thereof and there being connected to a jet pump device 47. The said system of grooves 45 crosses the point of juncture of the die blocks 2 and 2' and at that point of intersection, a bore 48 extends through the back of the die base to the passage formed by the beveled edges of the die blocks 2 and 2' to afford a means of evacuating air from any space between the die blocks and the cavity in which they are disposed. The rear face of the ejector die base 1 is covered by a backing plate 49 secured thereto by screws 50 to convert the groove system and counterbores into a system of conduits through which the suction induced by the jet pump 47 serves to evacuate any air that might otherwise reach the mold cavity in response to the negative pressure in the cavity created by the suction of the jet pump 25. Thus, due to the fact that every possible source of air entering the mold cavity is guarded by evacuating means separate from the cavity evacuating means, the latter is able to develop a very high degree of evacuation in the mold cavity and this, in addition to assured filling of the mold cavity has other important advantages to be later discussed in detail.

RUNNER BOCK MEANS

As far as described, the mold evacuating means of the present invention has not taken into account the fact that the sprue hole and runner would be in connection with atmosphere and this would severely handicap the effectiveness of the jet pumps to evacuate the mold. To overcome this, the runner 9 adjacent to the recess 8' formed in the die block 2' is interrupted by a bore 51 of slightly greater diameter than the width of the runner and which extends at right angles to said runner through the die block 2' and die base 1. Closely slidable in the bore 51 is the runner block plunger 52 having a flat end surface 53 which engages the flat face of the opposing die block 5; said surface 53 being interrupted by a shallow channel 54 of modified sectoral configuration in plan and extending across the side of the plunger 52 facing the portion of the runner 9 which joins the sprue hole 8 and across the end of a breather channel, to be presently described; whereby the channel 54 serves to interconnect the runner 9 with that channel. The bore 51 at the back face of the die base 1 is provided with a counterbore 55 and a groove 56 connects this counterbore with the groove 45 to subject the counterbore 55 and the bore 51 to the evacuation effect of the jet pump 47.

The opposite end of the runner block plunger 52 extends to the adjacent face of the ejector plate assembly 27 and terminates in an enlarged flanged head 57 which is non-rotatably and slidably engageable in a corresponding opening 57' in the retainer plate component 58 of the ejector plate assembly. Means, not shown serves to prevent rotation of the plunger. A cover plate 59 having a bore 60 in which the plunger 52 is slidable is secured to the retainer plate by screws 61 and a suitable compression spring 62 housed in and reacting between axially aligned bores 63 and 64 in the flanged end of the plunger and the backing plate 65 of the ejector plate assembly constantly urges the plunger away from the backing plate and the flanged head 57 thereof into engagement with the underside of the cover plate 59.

When the mold is closed, the runner block plunger 52 by its engagement with the die block 5 is pressed inwardly against the bias of the spring 62 sufficiently so that the flanged head 57 thereof is slightly spaced from the adjacent face of the retaining plate 59. In general practice this clearance is about 1/16" but may vary considerably according to the demands and requirements of molds for different castings. The spring 62 is of such strength as will not be able, as the mold is beginning to open, to start to dislodge the runner 9' from the runner 9 with possible cramping of the casting in the cavity and resulting damage to the ejector pin devices resulting from the cramping action. The strength of the spring is such as will cause the plunger 52 to follow the casting as it is moved out of the cavity by the ejector pins to the extent permitted by the flange 57 and retainer plate 59.

The channel 54 previously referred to in addition to extending across the runner 9 extends across a runner 66 extending laterally away from the plunger and the runner 9 to communicate with one side of a circular depression 67 in the die block 2'. A breather core 68 carried by the die block 2' is disposed in the center of the said depression and cooperates with a complementary tapered opening 69 in a replaceable sleeve 69' carried by the die block 6', said opening being aligned with a bore 69" extending through the die base 4. This use of a replaceable bushing can, of course, be employed with all of the other breathers shown, particularly those associated with molten material receiving cavities.

A separate groove 70 in the die base 4 extends from the bore 69' to a duct means 71 extending back into the die base and die block and thence to a jet pump means 72 at the top surface of the die base 4. Additionally, a pair of ejector pins 73, 73 are disposed at opposite sides of the breather core 68 and at the rear face of the die base 2. The bores in which said ejector pins 73 reciprocate are provided with counterbores 74 which are connected by a groove means 75 to the counterbore 55 and thus by the groove 56 to the jet pump 47. As has been previously noted, the backing plate 49 of the ejector die base forms all of these grooves into conduit means.

This breather may be merely left open to atmosphere or it may be connected to a jet pump device. Alternatively, it may be connected to a jet pump device which is left inactive. When the mold is used in connection with a hot chamber die casting machine, actuation of the jet pump operates to draw the metal from the gooseneck through the sprue hole and along the runner up to the runner block plunger 52 and thus prevents the intermixing of air in the sprue hole and runner with the advancing molten metal. In the case of a cold chamber die casting machine, the use of vacuum on this breather serves to remove the air as the shot cylinder pushes the metal toward and up to contact with the runner block plunger 52. The use of vacuum at this point is seldom, if ever, necessary in molds used for the injection molding of plastics.

Having reference to the above described mold and assuming that the mold as employed in a die casting machine, has been closed and is ready for a shot, the jet pumps 38 and 38' of the cover die and 47 of the ejector die are activated as is also the mold cavity evacuating jet jump 45. A vacuum gauge 76 mounted on the cover die is connected by a suitable duct means 77 to one of the breather bores 20 and when the machine operator observes from the gauge 76 that evacuation of the mold cavity has attained a certain predetermined value, he initiates the cycle of operation of the machine which usually proceeds automatically from initiation through steps comprising injection of the molten material, a delay of a predetermined time interval to allow the material to set, and the opening of the mold. Failure of the gauge to indicate the desired degree of evacuation is an indication that the mold is not properly closed and the operator can then take such steps to open the mold and clean the dies or whatever other steps may be necessary to eliminate the air leak that made it impossible to evacuate the mold cavity.

However, assuming that machine operation has been initiated by the operator, the machine shot plunger or piston forces the molten material into and through the sprue hole. In prior art molds, the air in the sprue hole was forced by the entering material into the mold cavity or cavities to be expelled therefrom by the molten material and such of the air as did not escape formed bubbles or other blemishes in the finished product. In the present invention, this air is blocked from entering the mold cavity by the runner block plunger 52 and is evacuated through the runner block breather and thence through the duct means 71 and the jet pump 72 which serves the breather bore 69. This breather, like all of the breathers, is self-sealing by the congealing material as taught by my said prior patent. Thus, the air in the sprue hole is eliminated without having been allowed to enter the evacuated mold cavity.

As soon as the injected material reaches the runner block, the force of injection causes the molten material to displace the runner block plunger 52 and flow through runner 9 to fill the mold cavity and all of the associated metal receiving spaces until all of the associated breathers are sealed by the congealed material; it being borne in mind that from the instant of the beginning of the flow of metal into the sprue hole to the filling of the mold cavity takes place in a very short time interval—usually in considerably less than one second. This completes the casting operation except for opening of the mold (which generally occurs as an automatic portion of the machine operation cycle) and removal of the product from the open mold. The control of the machine may be so arranged (see FIG. 14) that upon initiation of a cycle by the operator causing closing of the mold and the subsequent evacuation of the mold cavity, a normally open, vacuum responsive switch means also connected with the vacuum gauge 76 to the mold cavity may be so adjusted that upon attainment of the desired predetermined degree of evacuation of the mold cavity, closing of the vacuum responsive switch means would initiate the rest of the cycle of operation of the machine including the injection of the material and opening of the mold.

This capability of thus employing the evacuation of the mold cavity as the basis for injection of the molten material makes possible the further refinement also shown in FIG. 14. In this figure, the vacuum responsive switch 95 is normally open and is closed in response to a predetermined vacuum in the mold cavity as previously described. The switch is interposed in the lead 96 extending from the manually operable starting switch 97 (the equivalent of which, in fully automatic machine controls, would be machine operated) to the machine cycle control means (not shown). A lead 98 extends from the lead 96 at the side of the vacuum switch means which is remote from the switch 97 to a pressure registry mechanism 99 and a counter 100, both of which may be selected from devices available on the open market and both of which operate once upon each impulse received by reason of the closing of the vacuum switch, a lead 101 serving to complete the circuits therethrough to the lead 102 of the machine control operating circuit. The registering mechanism is connected to the vacuum switch by suitable means, here shown as a dotted line 103, to control the pressure indicating means in the recording of the successive negative pressures on the chart means of the registering device. This may be either by current regulated by a variable resistance associated with the vacuum switch or the dotted line may be a conduit leading to vacuum responsive means in the recording device. Various components for these purposes are either obtainable in the open market as standard existing devices or such standard devices can be readily modified to suit the foregoing desired action.

This vacuum recorder means and counter means are employed only in the making of castings in which the strength factor and freedom of interior flaws is critical. In machines engaged in making such castings, the operator is accompanied by an inspector who examines each casting as it comes from the machine. Accordingly, the vacuum registering and counting devices are positioned at the bench at which the inspector works adjacent to the machine and as each casting comes from the machine he observes the vacuum condition at which the injection occurred and applies the shot number shown on the counting means to the casting which may be by wax pencil or a numbering stamp or any other suitable mode of marking.

Experiment with each individual mold for different types of castings will have determined for that particular mold the degree of evacuation below which at least inspection will be necessary and above which further critical inspection by X-ray or the like will be unnecessary. Such experiment will also disclose the extent of evacuation at which X-ray or other examination would be useless and the casting rejected. Thus this invention has the added and most important advantage of making it possible to maintain a degree of quality control in pressure die castings not heretofore possible. Still further, this improved quality control enables designers confidently to incorporate die castings for uses not heretofore believed to be practicable due to the unreliability of die castings not formed under the uniform and optimum conditions available by molds employing the present invention.

Referring now to FIGS. 8–12, there is shown a second embodiment of the invention in which the application of vacuum to a mold cavity through the ejector pin bores is given still further utility. In FIG. 8 there is shown a casting comprising a dome-shaped end wall E surrounded by a circular flange F and an annular wall W projecting from the opposite side of the flange. As in normal practice in the design of molds for articles of the shape, the core portion forming the inner cavity of the casting is formed on the ejector half of the mold so that ejector pins on the ejector half may be employed to dislodge it from that core.

Specifically, the illustrated mold comprises a cover half comprising a cover die shoe 104 and cover inserts 105 and 106 and an ejector half comprising the ejector die shoe 107 and ejector die insert 108 and 109. If desired, and where it is practicable, a single die insert may be employed in each die shoe in place of the two inserts illustrated. This depends on such factors as the size of the casting, the number of cavities and like considerations. Since the invention is not concerned with whether or not the mold cavity is subjected to evacuation by means associated with the cover half, no mention will be made of anything except that which directly concerns the present invention. Actually, the illustrated casting might be molded with or without such other evacuating means dependent primarily upon the quality of casting desired.

To define the cavity in which the casting is formed, the ejector die insert is formed with a core portion 110 forming the portion of the casting constituting the interior of the dome portion E and with an annular groove 111 in which the wall W is formed. The cavity 112 forming the edge of the flange F and side thereof adjacent the convex surface of the dome end E is formed in the cover die insert and the opposite face of the flange F is formed by the face of the ejector die insert surrounding the groove 111. Molten material is shown as being supplied from a shot cylinder 113 through a sprue hole 114 and a runner 115 past an interposed gate 116 and thence into the cavity.

The mold ejector half is provided with a first series of ejector pins 117 which operative against the side of the flange F which rests on the face of the erector die insert. In this position, no problem of metal flow exists and hence, the guiding bores 118 for these pins need not be adapted to be connected to a source of vacuum. In a deep groove or comparable configuration in an ejector half of a mold, such as the groove 111, there is always danger that the flow pattern of the entering molten material may trap some air at the bottom of the groove or may not flow to completely fill the groove before solidifying. Any conventional die for a casting of this general shape will have ejector pins in the bottom of a groove or other equivalent configuration and the only practice heretofore has been to increase the clearance between the ejector pin and bore as much as possible without making that clearance so wide as to permit the molten material to enter when subjected to casting pressure. The same considerations apply to configuration such as the concave side of the dome end of the casting.

In the mold shown in FIGS. 9–12, the series of guiding bores 119 for the ejector pins 120 which engage the end of the wall W are provided with counterbores 121 at the outer face of the ejector die shoe and these counterbores are connected by grooves formed either in the cover plate 122 or in the die shoe rear face and other passages in the die shoe with an exteriorly disposed vacuum producing means in the same manner as taught in the first embodiment. The vacuum producing means may be mounted at any convenient outer surface of the ejector half or may be disposed at a remote point from the ejector half and connected to an orifice on the ejector half which is connected to the groove as, for example, in a manner hereinafter disclosed. Additionally, an ejector pin 123 is shown guided in a complementary bore 124 engaging the apex of the interior of the end member E and the bore 41 is provided with a counterbore 125 which may be connected with the counterbores 121 to the vacuum producing means.

Referring next to FIG. 10, one manner in which the cavity evacuating efficiency of the ejector pins and their bores to act as a venting means may be increased is shown. In that figure there is shown (somewhat exaggerated) that the portion of the ejector pins are reduced in diameter from a point perhaps ¼" from the cavity in thereof to a point which overlaps into the associated counterbore when the pin end is flush with the cavity surface in which it is disposed as shown at 126 on the ejector pins 120 and at 127 on the ejector pin 123. The outer end of the pin has a clearance of about .001"–.0015" on a side and the bores in the plate 122 through which these pins pass has a tight sliding fit with the pins. By this means, since the resistance to air flow is greatly reduced, the ability of the associated vacuum producing means is at least better able to expel air displaced by the entering molten material.

Referring next, to FIG. 12, there is shown an alternative mode of increasing the effectiveness of the venting by the ejector pin guiding bores. In this embodiment, the ejector pin 123' is of uniform diameter throughout its length. The bore 124' in the die insert through which the pin projects into the cavity is relatively short, probably less than ⅛" or not in excess of about ¾" in length, and has the required clearance to allow only air and gas to pass therethrough. The bore 124' leads into a long counterbore 128 which, in turn, extends to the wide shallow counterbore 129 which is connected to the vacuum system. The bore 130 in the cover plate 122, of course, forms a snug sliding fit with the ejector pin. Other variations are, of course, apparent such as forming grooves or flat sides on the ejector pins between the vacuum connected counterbore and the portion at the distal end of the ejector pin which must have the limited clearance to prevent the entry of molten material. This modification is particularly useful in situations requiring small diameter ejector pins acting to dislodge a casting from a cavity portion offering greater than ordinary resistance to ejection, since by forming, say, three or four longitudinal grooves with interposed lands, the possibility of the ejector pin buckling is prevented. Moreover, it will be understood that the number and location of ejector pins and the determination of whether some, all, or none shall be thus provided with the vacuum transmitting characteristics of the invention is a matter dependent upon the configuration of individual castings as is also the question whether all of the ejector pins thus subjected to vacuum are to be connected to a single vacuum producing means or may more advantageously be connected in groups to a plurality of vacuum producing means.

FIG. 13 illustrates a modification in which instead of mounting the various vacuum producing jet pump devices on the mold, they are mounted on branches of a manifold and are connected to the various vacuum intake ports of the mold by flexible hoses. This simplifies mold installation and removal and makes unnecessary the provision of a plurality of high pressure air lines to the mold. Moreover, the various lines actually used may be varied in the rate of flow of air more conveniently than in the construction in which the jet pumps are mounted on the mold.

Specifically, the illustrated embodiment of this modification shows the mold as being provided with elbow hose nipples 131, 132, 132′, 133 and 134 which are connected, respectively, by hoses 135, 136, 136′, 137 and 138 to jet pump devices 139, 140, 140′, 142 and 143. The air receiving ports of these jet pumps are connected by rigid conduit means to a manifold 144 which is connected to a source of compressed air and each such conduit is provided with a valve by which the flow of air to the connected hose may be varied or shut off as desired. As suggested by the showing of other valves and conduits at the opposite side of the manifold, any number of outlets for compressed air may be provided to suit the most complex molds.

With respect to this aspect of the invention, it is possible that in some instances (dependent on the casting configuration and volume) the application of vacuum through the ejector pin bores as above described may serve as the sole cavity evacuating means. Also in other instances, such as a casting of small volume but requiring a considerable number of ejector pins, it is possible that without the use of vacuum, the increased efficiency of the ejector pin bores made possible by the invention may serve as the sole cavity venting means.

While the foregoing specification has disclosed certain presently preferred embodiments of the invention, the invention is not to be deemed to be limited to the precise details thus disclosed by way of example, and it will be understood that the invention includes as well all such changes and modification in the parts, and in the construction, combination and arrangement of parts as shall come within the purview of the appended claims.

I claim:

1. In a separable mold comprising cover and ejector halves having meeting faces which combine to form a cavity into which molten material is to be injected under pressure along a runner defined by the meeting faces of said halves extending to said cavity and said mold further having reciprocable casting ejection means including at least one ejector pin having at least its opposite ends guided in a bore in said ejector half and communicating with said cavity and said ejector pin being operable, incident to separation of said halves, to dislodge the solidified casting from said cavity, a first vacuum producing means having the intake thereof connected to said bore and operative by said connection both to prevent the entrance of air to said cavity through said bore and to assist in the reduction of pneumatic resistance to the flow of molten material during the filling of said cavity and in which the clearance between the adjacent surfaces of said bore and said ejector pin at the juncture of said bore and said cavity is sufficiently small to resist the entry of molten material therebetween, the improvement which comprises increasing said clearance from a point closely adjacent the juncture of said bore with said cavity to the point of connection of said bore with said vacuum producing means with resultant reduction of resistance to air and gas flow from said cavity to said vacuum producing means.

2. A mold as claimed in claim 1 in which said first vacuum producing means cooperates with a second vacuum producing means having the intake thereof connected directly to said cavity through said cover half of said mold.

3. A mold as claimed in claim 1 in which said ejector half is provided with a plurality of ejector pins reciprocable in individual guiding bores therefor and in which less than all of said guiding bores are connected to said first vacuum producing means.

4. A mold as claimed in claim 3 in which the connection between said first vacuum producing means and those ejector pin guiding bores which are subjected to vacuum is effected by conduit means interposed between the intake of said first vacuum producing means and a point on each of those bores which is remote from said cavity.

5. A mold as claimed in claim 3 in those of said ejector pin bores which are connected with said first vacuum producing means are so connected by a conduit means including a single passage extending from the intake of said first vacuum producing means and branch passages extending from said single passage to each of those guiding bores, said branch passages being connected to each of those guiding bores at a point thereon at which said increased clearance exists.

6. A mold as claimed in claim 1 in which said ejector half includes a die shoe carrying a die insert, in which said cavity is formed in said die insert, in which said guiding bore extends through said die shoe and said die insert, in which said vacuum producing means is connected to said bore at the point of juncture of said bore with the surface of said die shoe remote from said cavity, in which the connection between said vacucm producing means and said guiding bore includes a counterbore at the end of said bore which emerges from said remote face of said die shoe, a conduit means extending from an exterior side face of said die shoe to said remote face thereof at a point spaced laterally from said counterbore, a cover plate detachably secured to said remote face of said die shoe and a channel formed by adjacent surfaces of said cover plate and said remote face of said die shoe extending between said conduit means and said counterbore.

7. A mold as claimed in claim 6 in which said ejector half is provided with a plurality of ejector pins guided in bores therefor and having counterbores for connection to said vacuum producing means and in which the adjacent faces of said cover plate and said die shoe are formed with a plurality of channels leading from said conduit means to one each of said counterbores for simultaneous application to vacuum to each of said plurality of guiding bores.

8. In a molding apparatus the combination of a separable mold having a cavity into which molten material is to be injected under pressure and comprising a cover die and an ejector die, said cover die having a sprue hole and said dies when juxtaposed forming the mold cavity, and runner means between said sprue hole and the mold cavity, vacuum producing means disposed remotely from said mold and having conduit means connected to other conduit means in said cover die rendering said vacuum producing means operative to evacuate said mold cavity, means preventing the passage of air and gas from the sprue hole to said mold cavity, means operative to allow the escape of gas and air in the sprue hole to atmosphere as molten material advances therein while operative to prevent the passage of the molten material to atmosphere, and resilient means imposing a bias on said means for preventing the passage of air and gas from the sprue hole to said mold cavity effective in response to imposition of the pressure of the injected molten material thereon to allow momentary displacement of said means for preventing the passage of air and gas to said mold cavity with resultant entry of the molten material into the evacuated mold cavity.

9. In a molding apparatus, a separable mold having a cavity into which molten material is to be injected under pressure, the combination of vacuum producing means disposed remotely from said mold and having conduit means connected to other conduit means in said mold affording connection of said vacuum producing means with the interior of said mold cavity, said vacuum producing means being operative when the mold is closed and prior to the injection of molten material to effect evacuation of said mold cavity, and a vacuum responsive means having independent and direct communication with said mold cavity effective upon attainment of a predetermined degree of vacuum in said mold cavity to initiate the injection of molten material into said mold cavity.

10. In a molding apparatus, a separable mold having a cavity into which molten material is to be injected under pressure, the combination of vacuum producing means disposed remotely from said mold and having conduit means connected to other conduit means in said mold affording connection of said vacuum producing means with the interior of said mold cavity, said vacuum producing means being operative when said mold is closed and prior to the injection of molten material to effect evacuation of said mold cavity, vacuum responsive means having independent and direct communication with said mold cavity effective to initiate injection of molten material into said cavity upon attainment of at least a predetermined degree of evacuation in said mold cavity and including a vacuum responsive gauge having separate communication with said mold cavity and further having indicating means visually denoting the degree of evacuation in said mold cavity.

11. In a molding apparatus, a separable mold having a cavity into which molten material is to be injected under pressure, the combination of vacuum producing means disposed remotely from said mold and having conduit means connected to other conduit means in said mold affording connection of said vacuum producing means with the interior of said mold said vacuum producing means being operative when said mold is closed and prior to the injection of molten material to effect evacuation of said mold cavity, vacuum responsive means having independent and direct communication with said mold cavity effective to initiate injection of molten material into said cavity upon attainment of at least a predetermined degree of evacuation in said mold cavity, and a counting device operatively associated with said vacuum responsive means effective to indicate visually a number serving to identify the casting produced by the injection of molten material which was effected by said vacuum responsive means with concurrent actuation of said operatively associated counting device.

12. In a molding apparatus, a separable mold having a cavity into which molten material is to be injected under pressure, the combination of vacuum producing means disposed remotely from said mold and having conduit means connected to other conduit means in said mold affording connection of said vacuum producing means with the interior of said mold cavity, said vacuum producing means being operative when said mold is closed and prior to the injection of molten material to evacuate said mold cavity, vacuum responsive means having independent and direct communication with said mold cavity effective to initiate injection of molten material into said cavity upon attainment of at least a predetermined degree of evacuation in said mold cavity, a recording means operatively associated with said vacuum responsive means effective at each initiation of injection of molten material into said mold cavity to record the degree of evacuation of the mold cavity at the instant of material injection, and a counting device operatively associated with said vacuum responsive means with concurrent actuation of said operatively associated counting device.

13. In a molding apparatus, a separable mold having a cavity into which molten material is to be injected under pressure, the combination of a vacuum producing means disposed remotely from said mold and including conduit means connected to other conduit means in said mold affording communication of said vacuum producing means with the interior of said mold cavity and being operative when the mold is closed and prior to the injection of molten material to evacuate said mold cavity, and vacuum responsive means having communication with said mold cavity effective upon attainment of a predetermined degree of vacuum in said mold cavity to initiate the injection of molten material into said cavity, said mold additionally including other vacuum producing means operative to create zones of vacuum at every point in said mold at which with said mold normally closed, air and gas might reach the evacuated mold cavity.

14. In a molding apparatus, a separable mold having a cavity into which molten material is to be injected under pressure, the combination of a vacuum producing means disposed remotely from said mold and including conduit means affording connection of said vacuum producing means with the interior of said mold cavity, said vacuum producing means being operative when said mold is closed and prior to the injection of molten material to effect evacuation of said mold cavity, a vacuum responsive means having independent and direct communication with said mold cavity effective to initiate injection of molten material into said cavity upon attainment of at least a predetermined degree of evacuation in said mold cavity, and a recording means operatively associated with said vacuum responsive means effective at each initiation of injection of molten material into said mold cavity to record the degree of evacuation of the mold cavity at the instant of material injection.

15. In a separable mold having a cavity into which molten material is to be injected under pressure through a runner communicating with said cavity, the combination of vacuum producing means connected to said mold and connected to the interior of said mold cavity and being operative when the mold is closed and prior to the injection of molten material to evacuate said mold cavity, the combination of a vacuum producing means having the intake thereof connected to said runner through an interposed conduit means; the point of said connection to said runner being sufficiently downstream of said point of material entry to enable said vacuum producing means to effect the exhaust of at least a major portion of the air and gas in said runner in advance of the entering molten material and said connection of said conduit means with said runner including an orifice of such narrow width that only air and gas can pass therethrough.

16. In a separable mold comprising cover and ejector halves combining to form a cavity for the reception of pressure injected molten material, a combined casting ejection pin and cavity venting means, said combined means comprising at least one ejector pin bore extending through the ejector half in a direction at least substantially parallel to the direction of movement of a casting out of the cavity and an ejector pin reciprocable in said bore between a retracted position in which the casting engaging end of said pin is coincident with the cavity surface and a second position in which said end is projected into the cavity; the radial clearance between said pin and said bore adjacent to said end of said pin for a distance of not less than about one eighth of an inch and not more than about three quarters of an inch from said cavity constituting a venting orifice of such narrow width that only air and gas may pass therethrough and the cross sectional area of said clearance between said orifice portion and a point of communication with atmosphere being substantially greater than the cross sectional area of the clearance consitituting said orifice portion.

17. A mold as claimed in claim 16 in which said greater clearance is achieved by a reduction in diameter of the portion of said pin in said bore beyond said orifice forming end portion.

18. A mold as claimed in claim 16 in which said greater clearance is achieved by forming at least one longitudinally extending flat side on the body of said pin beyond said orifice forming end portion.

19. A mold as claimed in claim 16 in which said greater clearance is achieved by forming at least one longitudinally extending groove on the body of said pin beyond said orifice forming end portion.

20. A mold as claimed in claim 16 in which said greater clearance is achieved by increasing the diameter of said bore beyond said orifice forming portion.

(References on following page)

References Cited

UNITED STATES PATENTS

| | | | |
|---|---|---|---|
| 3,108,339 | 10/1963 | Bucy | 18—42X |
| 3,247,550 | 4/1966 | Haines Jr. | |
| 3,302,253 | 2/1967 | Moriyama | 164—155X |
| 3,317,961 | 5/1967 | Drevalas et al. | 18—42 |
| 3,357,057 | 12/1967 | Bucy | 18—42 |

FOREIGN PATENTS 1,006,373  9/1965  Great Britain.

H. A. KILBY, Jr., Primary Examiner

U.S. Cl. X.R.

18—30; 164—155